United States Patent [19]

Mitchell et al.

[11] Patent Number: 4,873,112
[45] Date of Patent: Oct. 10, 1989

[54] FRUIT CONCENTRATE SWEETNER AND PROCESS OF MANUFACTURE

[75] Inventors: Cheryl R. Mitchell; Pat R. Mitchell, both of Manteca, Calif.

[73] Assignee: FruitSource Associates, Santa Cruz, Calif.

[21] Appl. No.: 224,298

[22] Filed: Jul. 26, 1988

[51] Int. Cl.⁴ .......................... A23L 1/222; A23L 2/00
[52] U.S. Cl. ..................................... 426/599; 426/658
[58] Field of Search .............................. 426/599, 658

[56] References Cited

U.S. PATENT DOCUMENTS

| | | | |
|---|---|---|---|
| 2,492,505 | 12/1949 | Suffens | 426/599 |
| 3,483,032 | 12/1969 | Stern et al. | 426/599 |
| 4,112,130 | 9/1978 | Gupta | 426/658 |
| 4,235,936 | 11/1980 | Kahn et al. | 426/599 |
| 4,244,984 | 1/1981 | Regling | 426/599 |
| 4,499,112 | 2/1985 | Miller | 426/599 |
| 4,562,080 | 12/1985 | Tenn | 426/658 |
| 4,609,561 | 9/1986 | Wade et al. | 426/599 |
| 4,753,816 | 6/1988 | Vink | 426/599 |

FOREIGN PATENT DOCUMENTS

| | | | |
|---|---|---|---|
| 0249446 | 12/1987 | European Pat. Off. | 426/599 |
| 0253550 | 1/1988 | European Pat. Off. | 426/599 |

Primary Examiner—Jeanette Hunter
Attorney, Agent, or Firm—John A. Bucher

[57] ABSTRACT

A fruit concentrate sweetener and process of manufacture are disclosed wherein the sweetener is formed from a hydrolyzed starch having a dextrose equivalent of about 5 to 25 and a clear fruit concentrate of at least about 40% soluble solids and about 0% insoluble solids to have about 40 to 65% complex carbohydrates, about 35 to 55% simple sugars from the fruit origin and about 0 to 5% nutritional components. The sweetener may be partially or substantially completely deflavorized and may be dried up to about 96 to 99% soluble solids. Further preferred steps of the process facilitate both deflavorization and drying while also yielding a sweetness level generally similar to sucrose with only about 50% simple sugars, the remainder being nutritionally desirable complex carbohydrates. The sweetener may be included in a variety of sweetened food and beverage products. The sweetener of the invention consists essentially of about 40 to 65% complex carbohydrates, about 35 to 55% simple sugars of a fruit origin, about 0% insoluble solids, about 0 to 5% nutritional components and about 0 to 3% of a sweetness potentiator, balance essentially water.

59 Claims, No Drawings

FRUIT CONCENTRATE SWEETNER AND PROCESS OF MANUFACTURE

FIELD OF THE INVENTION

The present invention relates to a sweetener composition and process for manufacturing the composition and more particularly to a sweetener composition formed from a fruit juice or fruit syrup concentrate and a corresponding process for manufacture.

BACKGROUND OF THE INVENTION

A number of sweetener compositions and corresponding methods of manufacture have been disclosed in the prior art. Similarly, the prior art has disclosed various products formed from fruits and corresponding methods of manufacture. These prior art products and methods of manufacture are discussed in relative detail below in order to assure an understanding of the present invention. The following discussion deals first with various sweeteners followed by a discussion of fruit products to be distinguished from the present invention.

Significant controversy has developed over the possible deleterious effects of large amounts of sucrose, synthetic sweeteners and refined simple carbohydrates in the human diet. The United States and Europe have recommended modifications in the diet which include a decrease in the uptake of simple sugars, and an increase in complex carbohydrates.

It has also been recommended that sucrose consumption be decreased based on its cariogenic effects and on the significant concern and controversy with regard to the role of dietary sucrose in the etiology of heart disease and diabetes.

Low calorie sweeteners have been used as an alternative to sucrose; however, concern has been expressed with regard to their carcinogenic and other potentially hazardous side effects.

Refined sweeteners such as corn syrup, dextrose and fructose have also been used as an alternative to sucrose. However, they are considered "empty" carbohydrate calories because they lack naturally occurring nutritional components such as vitamins, minerals and proteins which are now believed to aid in the digestion of carbohydrates.

Sweetener compositions which are currently known and used as alternatives to sucrose may be divided into three categories. These categories are titled low calorie sweeteners, refined sweeteners and natural or nutritious sweeteners in the following discussion.

Low calorie sweeteners include those sweetening compositions described in Glicksman et al, U.S. Pat. No. 4,001,456; Grosvenor U.S. Pat. No. 3,011,897; Schmitt et al, U.S. Pat. No. 3,653,922 and Fruda et al, U.S. Pat. No. 3,971,857. These sweetening compositions have been prepared by diluting the sweetening power of synthetic sweeteners such as saccharine, cyclamate or dipeptides with dextrose, sucrose, polyglucose, corn syrup solids or maltodextrins.

In an effort to bulk or expand these products to have a volume (but not weight or density) similar to sucrose, various techniques have been employed including dry-blending followed by agglomeration, spray-drying and vacuum drum drying. These products are unique and have the distinct advantage of fewer calories than an equivalent volume of sucrose. Some of these sweeteners, which include bulking agents such as corn syrup solids or maltodextrin in the formulation, also have the advantage of having complex carbohydrates. However, the low bulk density characteristic of these reduced calorie sweeteners also represent a very limited source (less than 0.5g/teaspoon or 5 cc) of complex carbohydrates.

Very importantly, the low calorie sweeteners have the disadvantage of containing controversial synthetic sweeteners which also have off-tastes and which decompose under certain food processing conditions. They also have the disadvantage of a substantially lower bulk density than sucrose, thereby excluding their use as a direct substitute for sucrose in many dry food products. Lastly, these low calorie sweeteners are also obviously void of naturally occurring nutritional components such as protein, vitamins and minerals.

The concept of blending refined sugars to produce sweetening composition products which contain reduced amounts of sucrose or no sucrose have been described in Batterman et al, U.S. Pat. No. 4,676,991; Batterman et al, U.S. Pat. No. 4,737,368; McNamara et al, U.S. Pat. No. 3,836,396 and Walon, U.S. Pat. No. 4,049,466. In all of these products, refined fructose has been used to replace or reduce the amount of sucrose.

In the two Batterman et al references, a blend of fructose and sucrose alone was thought to be advantageous because less of the resulting sweetening composition product was required to sweeten foods. This was due to the increased sweetening capacity of fructose which is 1.7 times that of sucrose.

The McNamara et al reference revealed that a sweetening composition product composed of sucrose, fructose and maltose actually reduced cariogenicity (tooth decay) which has been associated with sucrose alone.

The Walon reference taught that a sweetener composition product can be made by spray-drying a blend of fructose syrup with 50 to 70 weight percent of maltodextrin.

All of the sweetening compositions were reported to be similar in behavior, appearance, sweetness and bulk density when compared with sucrose. The primary disadvantage of these refined sweeteners is that they contained no other nutritional components such as vitamins, minerals and proteins, and for the most part are considered "empty" carbohydrate calories. The water whiteness of the refined sweeteners as in the case of the corn syrup, or sucrose dissolved in water, is also considered a disadvantage since the consumer perceives this lack of color as evidence of the deficiency of natural nutritional components.

Also, very recently, there has been some question with regard to the toxicity of fructose because of its metabolic competition with glucose. Consequently, sweetening compositions which contain more than 25% fructose on a solids weight basis have the potential of being deleterious to the individual.

The last category of sweetening compositions which may serve as an alternative to sucrose includes the natural and nutritious sweeteners. Nutritious sweeteners are understood to contain nutritional components such as vitamins, minerals and proteins which occur naturally in addition to the obvious carbohydrate content. These nutritious sweeteners include honey, maple, molasses, cane juice and hydrolyzed whole grain (sorghum, rice and barley) products. The primary disadvantage connected with these natural sweeteners if the distinct flavor associated with them making them undesirable as a substitute for sucrose in many food applications. Another disadvantage is the higher cost of natural sweeteners relative to sucrose making them economically unfeasible for many food applications where sucrose is currently used.

The above mentioned nutritional sweeteners have been available in liquid and solid forms. The solid sweetening compositions made from honey were a combination of fructose, glucose and complex carbohydrates. The complex carbohydrates were added as a drying aid.

Dried molasses also required complex carbohydrates as a driving aid and resulted in a sweetening composition containing glucose, fructose and sucrose (greater than 25% on a dry weight basis) and complex carbohydrates. Maple syrup and cane juice have been dried directly by evaporation techniques and resulted in sweetening compositions primarily comprising sucrose (greater than 75% on a dry weight basis) and residual amounts of fructose and glucose. The hydrolyzed whole grain products have also been dried directly by drum or spray drying to result in a sweetening composition including a combination of glucose, maltose and complex carbohydrates.

All of the above mentioned nutritional sweeteners contain at least about 0.5% by weight combined protein, vitamins and minerals and are usually colored as opposed to the whiteness of refined sucrose or the water whiteness of corn syrup. This relatively small percentage of nutritional components has been considered by some to be essential in the digestion and subsequent metabolism of carbohydrates.

Lately, there has been a tremendous surge of products which incorporate fruit juice, especially in products such as soft drinks. These products have been well received by the health conscious consumers. Fruit juice concentrates and, more recently, powdered fruit juice have been used as commercial items of trade to impart desirable flavors as well as some sweetness to these products.

Fruit juice concentrates are deficient in complex carbohydrates but do have a natural balance of fructose, glucose and sucrose and nutritional components such as viatmins, minerals and proteins. The primary difference between fruit juice and fruit juice concentrate is that the latter has been depectinized so as to allow concentration to at least 40% and preferably to 60 or 72% soluble solids without gelation.

The fruit juice concentrates provide economical benefits for reducing shipping costs by not having to transport unnecessary water weight. Unfortunately, these concentrates are susceptible to microbial instability and have a very limited shelf life unless refrigerated or frozen. Consequently, it is difficult and costly for many manufacturers to use these fruit products because of the necessary refrigerated storage conditions.

Further concentration to about 78% soluble solids of the 60 to 72% fruit juice concentrates results in a significantly more stable product which does not need refrigeration. However, undesirable browning and flavor alterations have been found to result from this concentration and to preclude its use.

Use of juice concentrates with less than 72% soluble solids, in food product formulations, has been severely limited due to their functional inability to be substituted on a 1:1 basis for corn syrup of approximately 80% soluble solids (the ingredient they are most likely replacing).

The flavor associated with these fruit juice concentrates of less than 72% soluble solids has also restricted their usage as a sweetener alternative for liquid sucrose or corn syrup. So called "deflavorized", "decolorized" and even "reduced acid" juice concentrates can be made from any clear fruit juice concentrate and have been made available commercially. "Fruit syrup concentrates" (as opposed to "fruit juice concentrates") are juice concentrates (thus depectinized) which are processed through a separate ion exchange system resulting in a substantially reduced flavor, color, acid and nutrients. However, some of these concentrates, and particularly pineapple, pear and mixed fruit, still exhibited significant color and fruit flavor identification, thus limiting their application.

The flavor associated with these fruit juice concentrates or fruit syrup concentrates, their poor storage stability, their physical and functional inability to be directly substituted for corn syrup or liquid sucrose in food formulations other than liquid beverages, and their high cost relative to sucrose or corn syrup have restricted their usage as an alternative sweetener. This is exemplified by the common use of fruit juice concentrates predominantly in the beverage industry at less than 10% by weight reconstituted juice, the primary sweetness being derived from alternative sources such as corn syrup products, artificial sweeteners, or sucrose.

Powdered fruit juices have been described in the literature for the purpose of preserving the fruit juice for later reconstitution with water and more specifically preserving the flavor material as well as the nutritional components. Because of the difficulties found in drying these juices which contain fructose, glucose and sucrose, as well as vitamins, minerals and proteins, a variety of different drying aids have been used. Hunter et al, U.S. Pat. No. 4,537,637 and Gupta et al, U.S. Pat. No. 3,953,615, disclosed hydration drying of fruit juice by the use of anhydrous alpha-glucose. Kern, U.S. Pat. No. 1,204,880 taught the use of insoluble cellulose fiber to dry and preserve fruit juice. Lee, U.S. Pat. No. 2,543,142 disclosed the use of hemicellulose xylan and calcium bearing phytates to dry and preserve fruit juice.

Gupta, U.S. Pat. No. 4,112,130; Stern, U.S. Pat. No. 3,483,032 and Fleming, U.S. Pat. No. 1,361,238 taught the use of hydrolyzed starch for the preservation of fruit juices with their flavors and natural nutritional components.

The Fleming reference specifically disclosed the use of hydrolyzed starch containing glucose, maltose and approximately 50% dextrin, for the drying of the 100% pure unconcentrated fruit juice. The Stern reference taught that 100% pure unconcentrated fruit juices could be readily dried using corn syrup solids in combination with lactose. The Gupta reference taught the use of solid maltodextrin for the drying of 100% pure orange juice. It was found in these latter patents that dried hydrolyzed starch products having a dextrose equivalent (D.E.) of less than 20 (by definition, hydrolyzed starch products of less than 20 D.E. may also be termed maltodextrins) were particularly effective as a drying aid for 100% pure fruit juices. By 1970, dried maltodextrin was a commercial item of trade. Liquid maltodextrin on the other hand has not been readily available due to its instability at 70% soluble solids and its extremely high viscosity even at 70% soluble solids, making handling of this raw material very difficult. Consequently, dried maltodextrin as opposed to the syrup form has been the preferred ingredient as indicated, for example, by its usage in the Gupta and Stern references noted above. The preparation and use of maltodextrins as a drying aid have been described in Horn et al, U.S. Pat. No. 3,826,857; Harjes et al, U.S. Pat. No. 3,974,033 and the Walon reference noted above. Accordingly, those references as well as the other U.S. Patents discussed herein are incorporated by reference to the extent that they will facilitate a better understanding of the present invention.

The aforementioned powdered fruit juices are used primarily for flavoring and/or reconstitution to liquid fruit juice beverages. In all of the above cases, the object of drying the fruit juice necessitated the preservation of the flavor material as well as the nutritional components.

Denny, U.S. Pat. No. 1,746,994 and Bartz, U.S. Pat. No. 2,525,761 taught the deflavorization of raisin syrup and fruit juice, respectively.

In the Denny reference, a syrup was made from raisins (as opposed to the whole fruit) and deflavorized by physical concentration of the extracted raisin liquor to 60° Brix and removal of crystallized tartrate compounds followed by treatment with lime which reportedly removed the residual tartrate compounds along with tannins and some color and flavor materials. Carbon was used to complete the removal of any residual color in the syrup.

The Bartz reference taught that fruit juices could be deflavorized, thereby producing mono- and di-saccharides sugars, liquid sugar and edible syrups. Unfortunately, the process claimed involved depectinization followed by chemical deflavorization via the addition of basic salts (aluminum, barium, strontium and preferably lead were given as examples). This was followed by the subsequent removal of divalent metallic elements as insoluble oxalates. Carbon was used primarily and essentially to remove all the color material to produce a water white liquor as well as removing "any remaining bitter principles and lead salts", thus indicating the use of carbon primarily for decolorization and secondarily for deflavorization purposes. It is understood that residual concentrations of the basic salts in parts per million (ppm) would exist in the finished product so that these basic salts would be contaminants additionally distinguishing the product.

It was also claimed that the water white liquor product of this invention could be spray dried directly (without the use of drying aids) to produce a product in solid form.

A variety of drying techniques have been used in making powdered fruit juices. These include spray drying at relatively low temperatures to preserve flavor and nutritional components, vacuum drum drying, rotary vacuum drying, and a relatively new method involving extrusion drying into a relatively cool solvent such as isopropyl alcohol.

Thus, although a wide variety of sweeteners have been made available in the prior art, there has been found to remain a need for a sweetener composition or compositions having improved, enhanced and novel characteristics as defined in greater detail below.

SUMMARY OF THE INVENTION

Accordingly, it is an object of the present invention to provide an improved fruit concentrate sweetener composition and process of manufacture for overcoming one or more disadvantages discussed above in connection with the prior art.

More particularly, it is a method of the present invention to provide a fruit concentrate sweetener composition and process of manufacture wherein the sweetener composition is formed as a blend of a hydrolyzed starch having a dextrose equivalent (D.E.) of up to about 25 and a fruit juice or fruit syrup concentrate of at least about 40% soluble solids and about 0% insoluble solids to form a liquor having a dry weight composition of about 40 to 65% complex carbohydrates, about 35 to 55% simple sugars from the fruit juice or fruit syrup concentrate and about 0 5% nutritional components.

The fruit concentrate sweetener composition referred to above may contain natural flavor components from its fruit origin. However, the fruit concentrate sweetener composition is preferably partially deflavorized or more preferably substantially completely deflavorized in order to form a bland sweetener product which can be directly substituted for prior art sweeteners such as granular or powdered sucrose, corn syrup and the like.

It is a corresponding object of the invention to provide the fruit concentrate sweetener composition and process for manufacture as described above wherein the sweetener composition is preferably dried to about 78 to 80% soluble solids to make the sweetener composition suitable for replacing corn syrup and the like or to dry the product to about 96 to 99% soluble solids to make the sweetener composition suitable for replacing powdered or granulated sucrose and like sweeteners.

Even more preferably, the dry fruit concentrate sweetener composition may be compacted in order to provide a bulk density substantially identical to the bulk density of the replaced sweetener.

In accordance with the object summarized above, the present invention provides a novel fruit concentrate sweetener composition and process of manufacture which can be employed as an alternative for conventional sweeteners such as sucrose, corn syrup and the like. At the same time, the fruit concentrate sweetener composition of the present invention is also novel in having all of the following qualifications as a sweetener product:

(1) The sweetener composition is derived from a natural source and preferably contains many if not substantially all of the nutritional components of the sweetener origin including vitamins, minerals and proteins as well as a natural combination of simple sugars such as glucose, fructose and sucrose from the fruit origin;

(2) The sweetener composition also has a significant quantity of complex carbohydrates (in excess of 1.5 grams/teaspoon or 5 cc.) which greatly enhance the nutritional value of the sweetener composition;

(3) The sweetener composition has been found to have a sweetening power and bulk density similar to that of sucrose so that the sweetener composition may be substituted substantially on a weight-for-weight basis for sucrose in most sweetened food products and beverage products;

(4) The sweetener composition, upon consumption, reduces the intake of simple sugars by approximately 50% with a corresponding increase in the intake of complex carbohydrates as compared, for example, to a conventional sweetener such as sucrose, because of the components of the sweetener composition as summarized above;

(5) The sweetener composition, at least in a preferred form, has a bland, clean flavor identifiable with that of refined sugar, for example;

(6) The sweetener composition is completely soluble with a rate of solution comparable to that of sucrose; and (7) The sweetener composition is relatively economical Thus, it is yet a further object of the invention to provide a unique and novel sweetening composition and process of manufacture capable of fulfilling all of the above criteria. As for the sweetener composition being economical, a direct comparison with existing sweeteners such as sucrose, corn syrup and the like naturally will depend upon a large number of factors. However, the sweetener composition of the invention is believed to be economical in the sense referred to above in that it is produced from a widely available source, namely a wide variety of fruits, and by processing techniques facilitating its manufacture.

It is yet a further object of the invention to provide various sweetened food and beverage products including the sweetener composition of the present invention as a basic component. Preferably, because of the characteristics of the sweetener composition as noted above, it may be substituted directly into most sweetened food and beverage products on a direct weight-for-weight basis compared to such conventional sweeteners.

It is a still further object of the invention to provide an improved process of manufacture for the sweetener composition of the invention. For example, the hydrolyzed starch component of the initial liquor blend preferably has a dextrose equivalent (D.E.) in the range of about 5 to 25, more preferably being a maltodextrin of about 5 to 15, and also more preferably comprising about 30 to 40% soluble solids prior to the maltodextrin being blended with the fruit juice or fruit syrup concentrate. The fruit juice or fruit syrup concentrate preferably comprises at least about 65 to 72% soluble solids. At the same time, the fruit juice or fruit syrup concentrate is employed in a clear condition indicating that it has about 0% insoluble solids.

The blending of the maltodextrin and fruit juice or fruit syrup concentrate as discussed above has been found not only to provide the unique combination of high sweetness and complex carbohydrate content but also facilitates both deflavorization and drying of the resulting sweetener composition in accordance with the present invention.

In accordance with the preceding summary, it is a basic object of the invention to provide a fruit concentrate sweetener composition consisting essentially of a dry weight composition of about 40 to 65% complex carbohydrates, about 35 to 55% simple sugars of a fruit origin, about 0% insoluble solids, about 0 to 5% nutritional components and about 0 to 3% of a sweetness potentiator, the balance of the sweetener composition being essentially water.

The sweetener composition summarized immediately above may be modified in substantially the same ways discussed above to form a wide variety of products including an initial liquor, a partially dried product of about 78 to 80% soluble solids or a substantially dried product having about 96 to 99% solids. At the same time, the sweetener composition preferably includes natural nutritional components from the fruit origin but may, if desired, have those nutritional components either removed or fortified. Still further, the sweetener composition of the present invention may be enhanced by addition of a sweetness potentiator added to enhance the sweetness of the sweetener composition as described in greater detail below.

Additional objects and advantages of the invention are made apparent in the following description.

DETAILED DESCRIPTION OF THE PREFERRED EMBODIMENTS

The sweetener composition of this invention is a blend of a hydrolyzed starch of less than 25 D.E. with a clear fruit juice concentrate or fruit syrup concentrate of greater than 40% soluble solids. The above blend having a dry weight composition of about 40% to 65% complex carbohydrates, about 35 to 55% simple sugars derived from the fruit juice concentrate or fruit syrup concentrate and about 0 to 5% nutritional components.

We found that hydrolyzed starch of less than 25 D.E. proved to be a very good drying aid as well as being an excellent source of complex carbohydrates. While commercially dried maltodextrins having a D.E. of less than 20 are available and would be the most logical to use since it is more practical to remove as little water as is absolutely necessary in the drying process, we found that its poor dissolvability from a manufacturing standpoint made its usage not only impractical but also non-economical. Liquid maltodextrin has been found to be more desirable from a blending point of view, although it is not readily available as a commercial item.

We found that by making the maltodextrin from starch by means of acid or enzyme and more preferably by bacterial amylase on a 30 to 40% dry substance basis (DSB) water/starch slurry, the maltodextrin formed had a D.E. of about 5 and a superior drying capacity. Starch hydrolysates having a D.E. of between 15 and 25 could also be used as a drying aid and source of complex carbohydrates in the said sweetener composition. However, the resulting sweetener composition products were slightly more hygroscopic than those products made with hydrolyzed starch of less than 15 D.E. This was presumed to be a consequence of the glucose and maltose which tended to contribute towards hygroscopicity in the final product.

We found it critical to keep the combined percentage of these simple sugars contributed by the hydrolyzed starch to the sweetening composition at below 10% and preferably less than 5%. We also found that centrifugation and/or filtration of the hydrolyzed starch liquor removes many of the bitter components associated with the liquor which otherwise detracted from the sweetness of the fruit juice concentrate when combined with the hydrolyzed starch.

Clear fruit juice concentrates may contain on a dry basis up to about 5% nutritional components such as vitamins, minerals and proteins, as opposed to fruit syrup concentrates which contain less and sometimes none at all. When the above concentrates were used to make the fruit concentrate sweetener composition, the product which resulted contained anywhere from 0 to 3% total nutritional components on a dry weight basis. We found that in some cases it was desirable to fortify the nutritional components by the addition of protein, vitamins and minerals so as to obtain a sweetening composition having up to 5% nutritional components on a dry weight basis.

Fruit juice concentrates and/or fruit syrup concentrates such as grape, pineapple, apple, pear and mixed fruit are examples of clear fruit concentrates which are commercial items of trade. Approximately 95% or more of their total soluble solids are a combination of simple sugars including glucose, fructose, sucrose and, most notably in the case of pear, sorbitol. These concentrates may also contain up to 5% nutritional components and 0% insoluble solids. Regardless of the fruit source of the concentrate, the resulting sweetener composition as described in this invention contained less than 27% fructose or sucrose.

The fruit concentrates are prepared from fruit juices by depectinization followed by concentration greater than 40% and usually between about 60 and 72% soluble solids. Prior to concentration, the clear fruit juices may be subject to decolorization and deflavorization by activated carbon and possibly acid reduction by deionizing techniques. While these concentrates are described as having reduced acid, color and flavor, we found them and particularly the pineapple concentrate to still possess significant fruit flavor identification and referred to them as being partially deflavorized. Depending on the application of the fruit concentrate sweetener composition, the flavor resulting from concentrates being used may or may not be acceptable. Therefore we considered a substantially completely deflavorized version of the product to be used in those applications where the effective absence of fruit flavor identification is critical.

Flavor profiles of products are usually complex chemical compositions which are not fully identifiable by analytical methods. The classic example of this is coffee which has been extensively analyzed and yet never successfully reproduced by synthetically combining the flavor constituents. Likewise, it is very difficult to determine the flavor profile of the fruit concentrates by chemical analytical techniques.

However, we did find that the method developed at Arthur D. Little, Inc. for determining flavor profile worked very well. Essentially, five trained persons functioned as a unit under the direction of a panel leader and produced a verbal description of the product. The flavor complex was described in terms of character notes, intensity, order of appearance, after-taste and amplitude. The panelists evaluated the products independently and then discussed results to arrive at common opinions. This method was used to evaluate the flavor of the fruit juice concentrates, the fruit syrup concentrates, the fruit concentrate sweetening compositions of this invention and products made with the said sweetening composition.

We found that the deflavorized fruit juice concentrates or fruit syrup concentrates of white grape, pear and apple contained the least flavor identification while pineapple contained the most. At the same time, we also found the pineapple to be the most desirable from both an economical and product point of view.

Economically, pineapple concentrate is the least expensive of the aforementioned fruit concentrates and the most consistent in supply and price. The pineapple concentrate also possesses a desirable blend of glucose, fructose and sucrose, which we found to significantly aid in the drying process and the functionality of the fruit concentrate sweetener composition. However, as mentioned above, the fruit juice concentrates and fruit syrup concentrates particularly from pineapple, even though they may have been deflavorized and decolorized by activated carbon and even deionized to reduce acid, still possessed significant flavor identification.

To our surprise, we found that diluting the fruit concentrate of 60 to 72% soluble solids with a hydrolized starch of less than 25 D.E. and of 30 to 40% dry substance basis to yield a sweet liquor of about 38 to 52% soluble solids having been only partially deflavorized with a flavor resembling that of the fruit concentrate being used, and subsequently treating this liquor with activated carbon for a limited time, that a substantially completely deflavorized liquor was obtained which was not necessarily totally decolorized.

We also found that the activated carbon also removed any remaining bitter notes derived from the hydrolyzed starch. Importantly, we found that no chemical agents were necessary to affect deflavorization and that physical adsorption by activated carbon under the conditions noted above were sufficient.

In fact, to our amazement, we also found a significant increase of 25% in relative sweetness between the liquor treated with activated carbon as described above, and an equivalent blend of refined fructose, glucose, sucrose and maltodextrin. Presumably, this additional sweetness of the fruit concentrate sweetener composition, as compared with the equivalent refined blend, is due to the natural nutritional components contained in the fruit concentrates.

We found that, after our treatment of the blended liquor with activated carbon, any of the fruit concentrates mentioned above could be used satisfactorily alone or in combination to yield a bland tasting fruit concentrate sweetener composition having no fruit flavor identification. The sweetness associated with those fruit concentrate sweetener compositions were found to be on the order of 0.8 that of sucrose. In food formulations where the sweetener constitutes greater than 30% of the total formulation, we found that there did not exist a significant difference in perceived sweetness. However, we found that, by adding a natural or synthetic sweetness potentiator such as stevioside, saccharine, dipeptides etc., at levels less than 3% and preferably less than 1% of the total soluble solids, the resulting sweetening composition had a sweetness equivalent to, or slightly exceeding sucrose. These fruit concentrate sweetener compositions containing a natural or synthetic sweetness potentiator at levels less than 3% were found to be beneficial in applications where low levels of sweetener (particularly less than 10%) were used.

Fruit concentrates are normally only concentrated to between 60 and 72% soluble solids because further concentration results in flavor degradation, browning and carmelization. Unexpectedly it was found that the fruit concentrate sweetener composition of this invention could be concentrated up to 80% soluble solids under vacuum at less that 70° C. and more preferably at 60° C. without flavor degradation or browning of the product.

With greater than 78% soluble solids, the product requires no refrigeration and for the most part is microbiologically stable due to the reduced water activity and osmotic pressure of the product. It was further found that this 78% fruit concentrate sweetener composition and particularly the deflavorized version, could readily be used to replace corn syrup on a 1:1 basis in many food applications including confectionery systems.

The sweetening composition of this invention, when substituted for corn syrup in many food formulations, was found to contribute similar mouthfeel and textural properties to food products normally obtained with corn syrup. Importantly from a manufacturing point of view, the fruit concentrate sweetening composition of 78 to 80% soluble solids also had a viscosity which was similar to corn syrup of 78 to 80% soluble solids. It was presumed that many of these textural and functional advantages as well as the ability of the fruit concentrate sweetening composition to be concentrated satisfactorily to 80% soluble solids, was a consequence of the presence of the complex carbohydrates from the hydrolized starch.

It was also found that the fruit concentrate sweetener composition (as opposed to fruit juice concentrate or fruit syrup concentrate) could be dried to between 96% and 99% soluble solids by most of the standard drying techniques including spray drying, drum-drying, freeze drying, foam-mat drying, rotary vacuum drying and extrusion drying. The dried product has a substantially lower hygroscopic nature than a dried fruit juice concentrate or fruit syrup concentrate alone, which has never really been achieved successfully anyway because of the hygroscopic nature of the dried fruit juice concentrate.

When natural components such as vitamins, minerals and proteins are present, it was additionally important to dry the product at substantially lower temperatures to preserve the nature of these components. However, it is also essential to maintain lower temperatures for many of the drying techniques discussed below to be lower than the melting point of the sweetening composition. The most preferred methods of drying are spray drying, drum-drying and rotary vacuum drying.

For spray drying purposes, it has been found that if the fruit concentrate sweetener composition is diluted with water to adjust the soluble solids to between 35 and 45% soluble solids, the liquor may be dried via spray drying with a centrifugal atomizer at 15,000 to 22,000 revolutions per minute (rpm), an inlet temperature of between 105° C. and 205° C. and an outlet temperature of between 70° C. and 90° C.

If the liquor is in excess of 45% soluble solids, we have found that the product does not atomize sufficiently to affect adequate drying and the material sticks to the walls of the dryer. At concentrations less than 35% soluble solids, the amount of water that would have to be removed would significantly increase the cost of drying the product to prevent the product from being economically competitive with sucrose.

We also have found that it is very important that the temperature of the liquor entering the spray dryer not exceed 70° C. Temperatures above the point results in an increased feed rate to the spray machine causing a "wetting" out of the chamber walls which does not happen under the same conditions with a liquor temperature of less than 70° C. Liquor temperatures under 38° C. are avoided because they tend to decrease the efficiency of the dryer as well as the atomizer capability. It is essential that the dried product temperature not exceed 62° C. as it then starts to melt and stick to the walls of the chamber.

The overall rate of drying is a function of air flow and subsequently the humidity level in the chamber. Due to the hygroscopic nature of the product material, it has been found that the product reluctantly releases moisture on drying and re-absorbs water rapidly in high humidity conditions. Hence, air supplied to the dryer is preferably dehumidified and supplied at such a rate so that the relative humidity is below that causing the product to become tacky. Also, the small size of the particle provided by the atomizer is essential to allow for easy release of the water being held by the product.

A different set of conditions has been found to be necessary for the sweetening composition when vacuum drying techniques were employed.

When vacuum drum-drying, the fruit concentrate sweetening composition for economical purposes is first concentrated under vacuum up to 80% soluble solids before being applied to the drums. The material is dried under vacuum at less than 70° C. Rotary vacuum drying is preferably accomplished in less than 30 seconds at temperatures of approximately 130° C. under vacuum to concentrate the fruit concentrate sweetening composition up to 99% soluble solids. The resulting molten glass is then deposited onto chilled rolls and flaked off resulting in particles of mesh sizes varying from 4 to 250 mesh. The particles are then classified to yield products of large and small mesh sizes for granular and powdered purposes.

It has been found that the fruit concentrate sweetening composition of up to 80% soluble solids may also be atmospherically drum dried. The product resulting from this operation is thermoplastic and cooled to form a glass which may then be milled to the appropriate size. Unexpectedly, the product has been found to be much less hygroscopic than the product obtained from spray drying. The atmospherically drum dried product product is brown in color and has a caramel flavor presumably resulting from the browning Maillard reaction. However, lower temperatures of approximately 105° C., and special application of the sweetening composition to the drums, have resulted in a very acceptable product being only slightly beige in color and having very little detectable off flavors. Upon grinding, the resulting granular crystals are relatively less hygroscopic than the spray dried powder and are very similar to sucrose in appearance and taste, having a bulk density of 0.85 g/cc.

The density of the dried fruit concentrate sweetener composition, with up to 99% soluble solids, has been found to be in the range of 0.7 to 0.85 g/cc while that of sucrose is 0.80 to 0.90 g/cc. The dried sweetener composition may also be densified if desired by slight compression through two rolls followed by grinding and sifting. The density of the resulting material is then between 0.8 and 0.9 g/cc.

The solubility of the dried fruit concentrate sweetening composition is similar to that of granulated sucrose, a 10% solution being totally dissolved in water within 30 seconds. Clumping caused by "wetting" of the composition powder may be alleviated by the addition of a dispersibility agent such as silicon dioxide at a level less than 2% weight/weight of the dried sweetener composition.

Overall, it has been found to our surprise that clear natural fruit concentrates or fruit syrup concentrates having a combination of simple sugars such as glucose, fructose and sucrose, with or without other nutritional components and upon being blended with a hydrolyzed starch of less that 25 D.E., results in a sweetener composition having unique functional and sweetening properties as well as valuable dietary nutritional advantages.

The dry weight composition of these sweetener compositions contains anywhere from 40 to 65% complex carbohydrates derived from the hydrolized starch. Approximately 35 to 55% simple sugars in the sweetening composition are derived from the fruit juice concentrate or fruit syrup concentrate. This relationship between simple and complex sugars is decidedly advantages from a nutritional guideline standpoint since food products made with the sweetener compositions of this invention, as a replacement for sucrose, reduces by approximately 50% the simple sugars and increases by approximately 50% the complex carbohydrates being consumed.

Importantly, the sweetener composition may also be substantially completely deflavorized if desired to avoid any flavor associated with its fruit source thereby resulting in a bland tasting product having taste characteristics similar to refined sweeteners such as sucrose and corn syrup. Very notably, the powdered or granular form of the sweetener composition product, having 96 to 99% soluble solids, has the bulk density, solubility and sweetness characteristics of sucrose. The sweetener composition of this invention may also be concentrated up to 80% soluble solids to form a stable product having textural and functional properties similar to corn syrup. It may thus be substituted for corn syrup on a 1:1 basis in most food formulations.

Lastly, from an economical point of view, blending of the relatively inexpensive corn starch which was hydrolyzed on site prior to mixing with the fruit concentrate, produced a natural fruit concentrate sweetener composition which was considerably less expensive, more stable, and having more food products application than the original fruit concentrate.

Thus, the present invention provides a novel fruit concentrate sweetener composition and process for manufacture in accordance with the preceding summary and description. Further preferred details of both the sweetener composition and process of manufacture are made apparent in the following examples.

EXAMPLE I

PREPARATION OF A HYDROLYZED STARCH BY ENZYME CONVERSION

An aqueous starch slurry was prepared by blending modified corn starch weighing between 170 and 270 Kg into 340 Kg water in a swept surface steam jacketed kettle. A bacterial alpha-amylase (Tenase 1200, a product of Miles Chemical Laboratories) in an amount of about 0.04% was then added and the slurry slowly heated over a period of time up to an hour to approximately 77° C. The enzyme conversion was allowed to continue until the desired dextrose equivalent was reached. The temperature of the liquor was then quickly raised to 120° C. to inactivate the enzyme and terminate the conversion. The hot liquor was immediately centrifuged and/or filtered. The starch hydrolysates thus prepared were between 30 and 40% soluble solids and had a D.E. of between 5 and 25.

EXAMPLE II

Preparation of a Hydrolyzed Starch by Acid-Enzyme Conversion

An aqueous starch slurry was prepared by blending modified corn starch weighing between 170 and 270 Kg into 340 Kg water in a swept surface steam jacketed kettle. The slurry was then partially acid hydrolyzed to a D.E. of between about 10 and 15. The pH of the acid hydrolyzed slurry was then adjusted to between 6 and 7. A bacterial alpha-amylase (Tenase 1200, a product of Miles Chemical Laboratories) in an amount of 0.04% was then added to the slurry at about 75° C. The slurry was kept at that temperature for approximately one to two hours to result in the desired starch hydrolysate of this invention before being brought to 120° C. to inactive the enzyme. After liquefaction was complete, the hydrolyzed starch liquor of between 30 and 40% soluble solids and between 15 and 25 D.E. was centrifuged and/or filtered.

Examples I and II disclose the preferred methods for forming a hydrolyzed starch component of the sweetener composition according to the present invention. However, these examples are merely illustrative of techniques for forming the hydrolyzed starch component. It is to be understood that other methods of manufacture may be employed as long as the hydrolyzed starch component is in the form of maltodextrin having the dextrose equivalent values recited for the present invention and preferably having between about 30 and 40% soluble solids prior to being blended with a clear fruit juice or fruit syrup concentrate according to the present invention. These characteristics for the hydrolyzed starch are necessary in the present invention to provide the complex carbohydrate composition for the sweetener product and also to facilitate both deflavorization and drying of the sweetener product.

EXAMPLE III

Preparation of a Flavored Pineapple Concentrate Sweetener

Composition

A clear pineapple juice concentrate of 40% soluble solids (50 weight percent on a dry basis) was blended with a hydrolyzed starch of 25 D.E. and 40% soluble solids (50 weight percent on a dry basis). The resulting sweetener composition of 40% soluble solids, had a strong and distinct pineapple flavor and the following percent by weight dry substance analysis:

| | |
|---|---|
| Glucose | 11.2% |
| Fructose | 12.0% |
| Sucrose | 25.1% |
| Maltose | 5.8% |
| Complex Carbohydrates | 43.0% |
| Nutritional Components | |
| (protein, vitamins and minerals) | 2.9% |

EXAMPLE IV

Preparation of a Partially Deflavorized Pineapple Concentrate Sweetener Composition A clear, deodorized and deflavorized pineapple juice concentrate (product of Gamma Foods, Wapato, Washington), of 70% soluble solids (50 weight percent on a dry basis) was blended with a hydrolyzed starch of 10 D.E. and 30% soluble solids (50 weight percent on a dry basis). The resulting sweetener composition of 42% soluble solids, had a slight but distinct pineapple flavor and the following percent by weight dry substance analysis:

| | |
|---|---|
| Glucose | 10.2% |
| Fructose | 13.0% |
| Sucrose | 26.5% |
| Maltose | 1.7% |
| Complex Carbohydrates | 48.1% |
| Nutritional Components | |
| (Protein, vitamins and minerals) | 0.5% |

EXAMPLE V

Preparation of a Completely Deflavorized Pineapple Concentrate Sweetener Composition A clear pineapple syrup concentrate (Ionex pineapple syrup concentrate from Dole Processed Foods) of 72% soluble solids (35 weight percent on a dry basis) was blended with a hydrolyzed starch of 5 D.E. and 30% soluble solids (65 weight percent on a dry basis). The combined sweetener composition of 38% soluble solids, had a slight but distinct pineapple flavor. The sweetener composition was then passed through a chamber containing activated granular carbon (CAL 12 IX 40 a product of Calgon Carbon Corporation) with a residence time of approximately 30 minutes. The substantially completely deflavorized, beige liquor had the following percent by weight dry substance analysis:

| | |
|---|---|
| Glucose | 7.5% |
| Fructose | 9.0% |
| Sucrose | 18.0% |
| Maltose | 0.7% |
| Complex Carbohydrates | 64.3% |
| Nutritional Components (Protein, vitamins and minerals) | 0.5% |

EXAMPLE VI

Preparation of a Completely Deflavorized Grape Concentrate

Sweetener Composition

A clear grape juice concentrate of 72% soluble solids (50 weight percent on a dry basis), having been deflavorized, decolorized and deionized, was blended with a hydrolyzed starch of 5 D.E. and 40% soluble solids (50 weight percent dry basis). The resulting partially deflavorized grape concentrate sweetener composition of 51% soluble solids, still had a very slight fruity flavor and distinctly beige color associated with it. The partially deflavorized sweetener composition was then passed through a chamber containing activated carbon with a residence time of up to two hours. The substantially completely deflavorized and decolorized grape concentrate sweetener composition had the following percent by weight dry substance analysis:

| | |
|---|---|
| Glucose | 27.0% |
| Fructose | 22.1% |
| Sucrose | 1.0% |
| Maltose | 0.6% |
| Complex Carbohydrates | 49.3% |
| Nutritional Components (Protein, vitamins and minerals) | 0% |

EXAMPLE VII

Preparation of a Completely Deflavorized, Nutritionally

Fortified, Mixed Fruit Concentrate Sweetener Composition

A clear Pineapple juice concentrate of 72% soluble solids and a clear grape juice concentrate of 70% soluble solids, both having been deflavorized, decolorized and deionized, were blended at a 50 to 50 dry substance basis to make a mixed fruit concentrate of about 71% soluble solids. This mixed fruit concentrate (50 weight percent on a dry basis) was then blended with a hydrolyzed starch of 5 D.E. and 35% soluble solids (50 weight percent on a dry basis). The resulting sweetener composition of 46% soluble solids, was considered to be partially deflavorized having a slight fruity flavor identified as pineapple. This partially deflavorized mixed fruit sweetener composition was then passed through a chamber containing activated carbon with a residence time of approximately 60 minutes. The completely deflavorized sweetener composition had the following percent by weight dry substance analysis:

| | |
|---|---|
| Glucose | 18.4% |
| Fructose | 17.3% |
| Sucrose | 13.0% |
| Maltose | 0.8% |
| Complex Carbohydrates | 49.9% |
| Nutritional Components (Protein, vitamins and minerals) | 0.6% |

Nutritional Components (Protein, vitamins and minerals) 0.6%

To the above sweetening composition was added water soluble protein, vitamins and minerals so as to contain 5% nutritional components.

Examples II through VII illustrate various types of fruit juice or fruit syrup concentrates which can be employed in accordance with the present invention for blending with the hydrolyzed starch component to form the sweetener composition of the present invention. As noted above, the fruit juice or fruit syrup concentrate is always initially clear, corresponding with the additional requirement that both the fruit juice of fruit syrup concentrate and the resulting sweetener composition have approximately 0% insoluble solids.

These examples further illustrate that the preferred form of the clear fruit juice or fruit syrup concentrate, upon combination with the hydrolyzed starch component, can also facilitate deflavorization and drying of the resulting sweetener composition.

More preferably, the resulting sweetener composition is also seen to include natural nutritional components from the fruit juice or fruit syrup concentrate.

EXAMPLE VIII

Preparation of a Fruit Concentrate Sweetener Composition Containing a Natural Sweetening Potentiator A sweetener composition similar to that described in Example V above but additionally containing 3% of the dried and finely ground (200 mesh) leaves of the stevia rebaudiana plant. The potentiated sweetener composition of this example was found to have sweetness greater than sucrose.

EXAMPLE IX

Preparation of a Fruit Concentrate Sweetener Composition Containing a Synthetic Sweetening Potentiator A sweetener composition similar to Example IV above but also containing saccharin at a level of 0.04% dry substance basis to produce a sweetener composition had a sweetness greater than sucrose.

Examples VIII and IX merely indicate that the sweetener composition of the present invention may be further enhanced by the addition of either a natural or synthetic sweetening potentiator. The effect of the sweetening potentiator is to increase sweetness of the sweetener composition to a level greater than that for conventional sweeteners such as sucrose, corn syrup or the like. As noted elsewhere, such a potentiated sweetener composition according to the present invention is useful in various sweetened food and beverage products, particularly those products having a relatively low percentage of a sweetener component.

EXAMPLE X

Preparation of an 80% Soluble Solids Fruit Concentrate Sweetener Composition

The sweetener composition of Example V was concentrated under vacuum at 60° C. to a slightly beige syrup having a viscosity of approximately 100 Poises at 37° C. The product was stored at ambient temperature for 3 months with no indication of microbial instability.

EXAMPLE XI

Preparation of an 78% Soluble solids Fruit Concentrate Sweetener Composition

The sweetener composition of Example VI was concentrated under vacuum at 70° C. to a colorless syrup having a viscosity of approximately 90 Poises at 37° C. The product was stored at ambient temperature for 3 months with no indication of microbial instability.

Examples X and XI demonstrate that a sweetener composition produced in accordance with the present invention can be stored even at ambient conditions for extended periods of time without microbial instability. These examples further demonstrate the relative ease with which the sweetener composition can be concentrated to approximately 80% soluble solids in order to form a syrup type sweetener suitable, for example, for direct replacement of sweeteners such as corn syrup and the like.

EXAMPLE XII

Preparation of a Spray Dried Fruit Concentrate Sweetener Composition

The fruit concentrate sweetener composition of Example III was diluted with water to 35% soluble solids and the temperature of the in-going liquor composition was adjusted to 38° C. The centrifugal atomizer was set at 22,000 rpm and the dryer set at an inlet temperature of 105° C. and an outlet temperature of 70° C. Two percent dry weight Syloid Silica (silicon dioxide) was added to the product cooling tubes. The white amorphous powder of between 100 and 200 mesh contained 1.8% moisture and had a density of 0.7 g/cc. The product was found to be completely soluble in water at 10% soluble solids at a time within 30 seconds.

EXAMPLE XIII

Preparation of a Spray Dried Fruit Concentrate Sweetener Composition

The fruit concentrate sweetener composition of Example VI was diluted with water to 45% soluble solids and the temperature of the in-going liquor composition was adjusted to 70° C. The centrifugal atomizer was set at 15,000 rpm and the dryer set at an inlet temperature of 205° C. with an outlet temperature of 90° C. Approximately 1% Syloid Silica (silicon dioxide) was added to the product in the cooling tubes. The dried product of less than 62° C. was a white amorphous powder of between 50 and 150 mesh and having a moisture content of approximately 2.7%.

EXAMPLE XIV

Preparation of Vacuum Drum Dried Fruit Concentrate Sweetener Composititon

A fruit concentrate sweetener composition of Example V was vacuum drum dried at a drum temperature of less than 70° C. resulting in a flaky white sheet of 96% soluble solids.

EXAMPLE XV

Preparation of a Rotary Vacuum Dried Fruit Concentrate Sweetener Composition

The fruit concentrate sweetener composition of Example V was evaporated to dryness of 98% soluble solids at a temperature of 65° C. by using a rotary vacuum to concentrate the liquor and then deposit it at 98% soluble solids onto chilled flaker rolls. The dried product was of varying mesh sizes of from 4 to 250 mesh which were then air classified to make a relatively granular form of the dried sweetener composition as well as a powder form of the composition. The density of the product was found to be approximately 0.85 g/cc.

EXAMPLE XVI

Preparation of an Atmospherically Drum-Dried Fruit Concentrate Sweetener Composition The sweetener composition of Example V was atmospherically drum dried at 105° C. to produce a melted glass of 99% soluble solids which dried rapidly upon cooling and was relatively non-hygroscopic after grinding. Coarse particles of between 20 and 60 mesh were obtained having an density of 0.85 g/cc.

Examples XII through XVI demonstrate the ability of the sweetener composition of the present invention to be dried to approximately 96 to 99% soluble solids, that is substantially completely dried. In this form, the sweetener composition of the present invention can be used as a direct replacement for conventional sweeteners such as powdered or granular sucrose, for example. The ability to concentrate the sweetener composition of the present invention to approximately 80% soluble solids and to about 96 to 99% soluble solids is dependent upon the combination of maltodextrin and the fruit juice or fruit syrup concentrate as discussed in greater detail above.

EXAMPLE XVII

Preparation of a Densified Fruit Concentrate Sweetener Composition

The spray dried fruit concentrate sweetener composition of Example XII, having a density of 0.7 g/cc, was densified by passing the product through two rolls which were maintained at a temperature of 35° C. As the fine amorphous powder pass through the pinch of the rolls, a pressed sheet was formed which when ground and the product classified to obtain particles within the range of 20 to 40 mesh, was found to have a density of 0.9 g/cc.

Example XVII demonstrates the ability to densify the sweetener composition of the invention in its dry form so that it has a bulk density substantially identical with that of a conventional sweetener, for example, sucrose.

EXAMPLE XVIII

Preparation of a Table Sweetener Product

A completely deflavorized fruit concentrate sweetener composition containing approximately 49.5% complex carbohydrates, 49.5% simple sugars, and 1% nutritional components, was dried by rotary vacuum, milled and air classified to obtain particles of 20 to 40 mesh. The granular sweetener composition was then used to sweeten coffee on a weight-for-weight and volume-for-volume basis instead of granular sucrose. The coffee containing the granular fruit concentrate sweetener of this invention was then compared to coffee that had been sweetened with an equivalent amount of sucrose. The sweetening composition containing product was found to be more preferred than the sucrose containing product.

Example XVIII further demonstrates the ability to form the sweetener composition of the present invention as a dried product suitable, for example, in direct replacement of conventional table sweetener products.

EXAMPLE XIX

Preparation of a Chocolate Confectionery Product

A completely deflavorized fruit concentrate sweetener composition was blended with chocolate liquor at a level of 55 parts sweetener to 45 parts liquor, with minor parts of lecithin and vanilla. The resulting paste was milled and refined according to standard chocolate manufacturing practices to produce a chocolate having a refined sweetness similar to that of a sucrose containing product.

EXAMPLE XX

Preparation of Instant Pre-Sweetened Tea

A partially deflavorized powdered fruit concentrate sweetener composition was blended on a dry weight basis at a level of 50 parts sweetener with 50 parts dry instant tea powder and slight amounts of natural raspberry flavor. The resulting dry blend was then agglomerated and fluid bed dried to obtain an instantly soluble pre-sweetened, raspberry flavored instant tea mix. One teaspoon of the tea mix was dissolved in 250 ml of water to produce a sweet, raspberry tea flavored beverage.

EXAMPLE XXI

Preparation of Hard Candies

A pineapple concentrate sweetener composition of 80% soluble solids was cooked in a vacuum pan to 94% soluble solids. The cooked syrup was then deposited and cooled to produce a hard pineapple candy that was tack free under atmospheric conditions.

Examples XIX—XXI are illustrative of various sweetened food and beverage products which can be formed including the sweetener composition of the present invention in place of a conventional sweetener such as sucrose, corn syrup and numerous other sweeteners.

Additional food and beverage products can of course similarly be formed with the sweetener composition of the present invention including, for example, pastries and various sweetened prepared foods as well as a variety of instant concentrated or ready to drink beverages.

Thus, there has been described above a wide variety of sweetener compositions and corresponding processes of manufacture which are considered to be encompassed by the present invention. However, the preceding description and examples are not to be taken to define the scope of the present invention. Rather, the scope of the invention is defined only by the following appended claims.

What is claimed is:

1. A fruit concentrate sweetener composition comprising a blend of a hydrolyzed starch having a dextrose equivalent (D.E.) of up to 25 and a fruit juice or fruit syrup concentrate of at least about 40% soluble solids and about 0% insoluble solids thereby forming a liquor having a dry weight composition of about 40 to 65% complex carbohydrates, about 35 to 55% simple sugars from the fruit juice or fruit syrup concentrate and about 0 to 5% nutritional components occurring naturally in the fruit juice or fruit syrup concentrate.

2. The fruit concentrate sweetener composition of claim 1 wherein the hydrolyzed starch has a D.E. of about 5 to 25 and the fruit juice or fruit syrup concentrate has at least 60% soluble solids.

3. The fruit concentrate sweetener composition of claim 2 wherein the hydrolyzed starch is maltodextrin comprising about 30 to 40% soluble solids before being blended with the fruit juice or fruit syrup concentrate, the fruit juice or fruit syrup concentrate comprising at least about 65 to 72% soluble solids.

4. The fruit concentrate sweetener composition of claim 3 wherein the maltodextrin has a D.E. of about 5 to 15.

5. The fruit concentrate sweetener composition of claim 1 wherein the concentrate is contacted with activated carbon for a period of time selected to at least partially deflavorize the sweetener composition.

6. The fruit concentrate sweetener composition of claim 1 wherein the concentrate is contacted with activated carbon for a period of time selected to substantially completely deflavorize the sweetener composition.

7. The fruit concentrate sweetener composition of claim 6 wherein the concentrate is dried to about 78 to 80% soluble solids to form the sweetener composition suitable for replacing corn syrup and the like.

8. The fruit concentrate sweetener composition of claim 6 wherein the concentrate is dried to about 96 to 99% soluble solids to form the sweetener composition suitable for replacing powdered or granulated sucrose and like sweeteners.

9. The fruit concentrate sweetener composition of claim 8 wherein the concentrate is compacted to have a bulk density substantially identical to the bulk density of the replaced sweetener.

10. The fruit concentrate sweetener composition of claim 6 wherein the concentrate is diluted with water to about 35 to 45% soluble solids to form a liquor suitable for spray drying.

11. The fruit concentrate sweetener composition of claim 10 wherein the concentrate is spray dried to form a product having about 96 to 99% soluble solids.

12. The fruit concentrate sweetener composition of claim 6 wherein the concentrate is drum dried to form a product having about 96 to 99% soluble solids.

13. The fruit concentrate sweetener of claim 6 wherein the concentrate is rotary vacuum dried to about 96 to 99% soluble solids.

14. The fruit concentrate sweetener composition of claim 1 wherein the concentrate is dried to about 78 to 80% soluble solids to produce the sweetener composition in a syrup form.

15. The fruit concentrate sweetener composition of claim 1 wherein the concentrate is dried to about 96 to 99% soluble solids.

16. The fruit concentrate sweetener composition of claim 1 wherein the hydrolyzed starch is selected to have a dextrose equivalent (D.E.) value of about 5 to 15.

17. The fruit concentrate sweetener composition of claim 6 wherein the clear fruit juice concentrate or fruit syrup concentrate is selected from the group consisting of grapes, pears, pineapple, apples and mixtures thereof.

18. The fruit concentrate sweetener composition of claim 1 wherein the clear fruit juice concentrate or fruit syrup concentrate is selected from the group consisting of grapes, pears, pineapple, apples and mixtures thereof.

19. The fruit concentrate sweetener composition of claim 1 wherein the simple sugars are derived from the fruit juice concentrate and comprise glucose, sucrose and fructose.

20. The fruit concentrate sweetener composition of claim 1 combined with other selected ingredients to form a sweetened food product or sweetened beverage.

21. A sweetened food product or beverage including a fruit concentrate sweetener composition comprising a blend of a hydrolyzed starch having a dextrose equivalent (D.E.) of up to about 25 and a clear fruit juice or fruit syrup concentrate of at least about 40% soluble solids and about 0% insoluble solids to form a liquor having a dry weight composition of about 40 to 65% complex carbohydrates, about 35 to 55% simple sugars from the fruit juice or fruit syrup concentrate and about 0 to 5% nutritional components.

22. The sweetened food product or beverage of claim 21 being of a type normally including a sweetener syrup such as corn syrup, wherein the fruit concentrate sweetener composition is dried to about 78 to 80% soluble solids before being added to the sweetened food products.

23. The sweetened food product or beverage of claim 21 being of a type normally including a dried sweetener such as sucrose, wherein the fruit concentrate sweetener composition is dried to about 96 to 99% soluble solids before being added to the sweetened food products.

24. The sweetened food product or beverage of claim 21 wherein the fruit concentrate sweetener composition is partially deflavorized for use in a sweetened food products where the flavor is masked or where a faint fruit flavor is unobjectionable or desirable.

25. The sweetened food product or beverage of claim 21 wherein the fruit concentrate sweetener composition is substantially completely deflavorized to permit its inclusion in the sweetened food products as a nutritious sweetener without an accompanying fruit flavor.

26. The sweetened food product or beverage of claim 25 wherein the fruit concentrate sweetener composition is dried to about 96 to 99% soluble solids and compacted to facilitate its use in the sweetened food products in place of a conventional sweetener product such as sucrose.

27. The sweetened food product or beverage of claim 21 wherein the hydrolyzed starch in the fruit concentrate sweetener composition is selected to have a D.E. value of about 5 to 15.

28. The fruit concentrate sweetener composition of claim 21 further comprising about 0 to 3% of a sweetness potentiator.

29. A fruit concentrate sweetener composition consisting essentially of a dry weight composition of about 40 to 65% complex carbohydrates, about 35 to 55% simple sugars of a fruit juice or fruit syrup concentrate origin, about 0% insoluble solids, about 0 to 5% nutritional components and about 0 to 3% of a sweetness potentiator, balance essentially water.

30. The fruit concentrate sweetener composition of claim 29 wherein the complex carbohydrates comprise hydrolyzed starch having a D.E. of about 5 to 25.

31. The fruit concentrate sweetener composition of claim 30 wherein the hydrolyzed starch has a D.E. of about 5 to 15.

32. The fruit concentrate sweetener composition of claim 31 being contacted with activated carbon for a period of time selected to at least partially deflavorize the sweetener composition.

33. The fruit concentrate sweetener composition of claim 31 being contacted with activated carbon for a period of time selected to substantially completely deflavorize the sweetener composition.

34. The fruit concentrate sweetener composition of claim 29 being dried to about 78 to 80% soluble solids to produce the sweetener composition in a syrup form.

35. The fruit concentrate sweetener composition of claim 29 being dried to about 96 to 99% soluble solids.

36. The fruit concentrate sweetener composition of claim 29 further comprising about 0 to 3% of a sweetness potentiator.

37. A process for forming a fruit juice sweetener, comprising the steps of blending a hydrolyzed starch of less than about 25 D.E. and having about 30 to 40% soluble solids, with a fruit juice or fruit syrup concentrate having at least about 40% soluble solids, and thereby forming a liquor having a dry weight composition of about 40 to 65% complex carbohydrates, about 35 to 55% simple sugars from the fruit juice or fruit syrup concentrate and about 0 to 5% nutritional components.

38. The process of claim 32 further comprising the step of drying the liquor to about 78 to 80% soluble solids to form a syrup type sweetener.

39. The process of claim 37 further comprising the step of drying the liquor to about 95 to 99% soluble solids to form a dry sweetener.

40. The process of claim 39 wherein the liquor is diluted to about 35 to 45% soluble solids and then spray dried.

41. The process of claim 40 wherein the diluted liquor is maintained in a temperature range of about 38 to 70° C. during spray drying.

42. The process of claim 40 wherein the diluted liquor is maintained at a temperature of about 70° C. during spray drying.

43. The process of claim 37 further comprising the step of partially deflavorizing the blended liquor.

44. The process of claim 43 further comprising the step of drying the liquor to about 78 to 80% soluble solids to form a syrup type sweetener.

45. The process of claim 43 further comprising the step of drying the liquor to about 96 to 99% soluble solids to form a dry sweetener.

46. The process of claim 43 wherein the liquor is diluted to about 35 to 45% soluble solids and then spray dried.

47. The process of claim 37 further comprising the step of substantially completely deflavorizing the blended liquor.

48. The process of claim 47 further comprising the step of drying the liquor to about 78 to 80% soluble solids to form a syrup type sweetener.

49. The process of claim 47 further comprising the step of drying the liquor to about 96 to 99% soluble solids to form a dry sweetener.

50. The process of claim 47 wherein the liquor is diluted to about 35 to 45% soluble solids and then spray dried.

51. The product of the process of claim 50.
52. The product of the process of claim 49.
53. The product of the process of claim 48.
54. The product of the process of claim 47.
55. The product of the process of claim 43.
56. The product of the process of claim 42.
57. The product of the process of claim 39.
58. The product of the process of claim 38.
59. The product of the process of claim 37.

* * * * *

UNITED STATES PATENT AND TRADEMARK OFFICE
CERTIFICATE OF CORRECTION

PATENT NO. : 4,873,112

DATED : October 10, 1989

INVENTOR(S) : Cheryl R. Mitchell, et al.

It is certified that error appears in the above—identified patent and that said Letters Patent is hereby corrected as shown below:

On the title page and at the top of column 1 (in the title) "SWEETNER" should be --SWEETENER--.

In column 6, line 11, "0 5%" should be --0 to 5%--.

In column 12, lines 67-68, "advantages" should be --advantageous--.

In column 15, line 13, "12 1x 40" should be --12 x 40--.

In column 21 at each of lines 38-39, 44-45, 49, 54 and 59-60, "products" should be --product or beverage--.

In column 22, line 44, "95" should be --96--.

Signed and Sealed this

Fifth Day of February, 1991

Attest:

HARRY F. MANBECK, JR.

Attesting Officer

Commissioner of Patents and Trademarks